Figure 1:
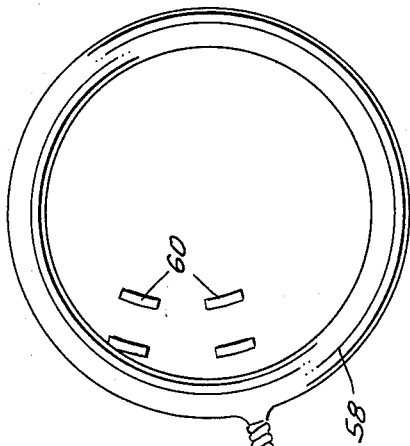
Figure 1:
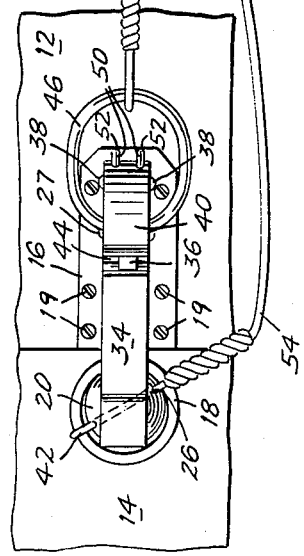

Feb. 4, 1964    H. C. GUTACKER    3,120,365
PARACHUTE RELEASE
Filed Jan. 22, 1962

INVENTOR
*Harry C. Gutacker,*

BY *Diggins & LeBlanc*
ATTORNEYS

United States Patent Office 3,120,365
Patented Feb. 4, 1964

3,120,365
PARACHUTE RELEASE
Harry C. Gutacker, Lancaster, Pa., assignor to Hamilton Watch Company, Lancaster, Pa., a corporation of Pennsylvania
Filed Jan. 22, 1962, Ser. No. 167,750
15 Claims. (Cl. 244—149)

This invention relates to a release arrangement and more particularly to a parachute release which will not stick or jam should the release accidentally be damaged or deformed.

In conventional parachute pack and canopy release mechanisms where the flap of the parachute pack is held closed by a catch or clamp arrangement, circumstances often occur during packing, handling or use of the pack which prevent the efficient and proper function of the release mechanism. Needless to say, such malfunctions of the flap release mechanism may have disastrous consequences and therefore cannot be tolerated. Various manual and automatic release mechanisms have been proposed from time to time but, for one reason or another, have failed to completely alleviate the jamming problem.

According to the present invention, it has been found that this jamming difficulty may be overcome by using a catch or latch arrangement having a spring loaded release clamp held in place by a locking catch. This release clamp or locking arrangement is so formed that no amount of abuse, damage, or breakage of parts will prevent the release from operating properly when the ripcord of the parachute is pulled. To assure proper packing and ease of handling or adjustment prior to actual use, the parachute catch arrangement is provided with a novel packing pin which is automatically released thereby placing the parachute in operating condition when the ripcord pull ring is either placed in its ready position or is pulled to actuate the parachute. The fact that the catch arrangement is connected to the opening flap of the parachute pack and that the ripcord is permanently secured to the catch insures a faster and more positive operating parachute than those provided by heretofore known like devices.

Accordingly, it is a primary object of this invention to provide a parachute pack release arrangement that cannot jam.

Another object of this invention is to provide a catch release which is simple and inexpensive to construct yet will function correctly even if damaged or deformed.

Yet another object of this invention is to provide a parachute release mechanism having a packing catch which is automatically released when the ripcord release ring is placed in operating condition or pulled.

Still yet another object of this invention is to provide a parachute having a ripcord which remains permanently attached to the release mechanism.

A further object of this invention is to provide a parachute release mechanism in which the pull exerted on the ripcord is used to aid in the opening of the parachute flap.

Still a further object of this invention is to provide a parachute release mechanism that can be operated by an automatic release arrangement.

These and further objects and advantages of the invention will become more apparent upon references to the following description and claims and the appended drawings wherein.

Figure 2:
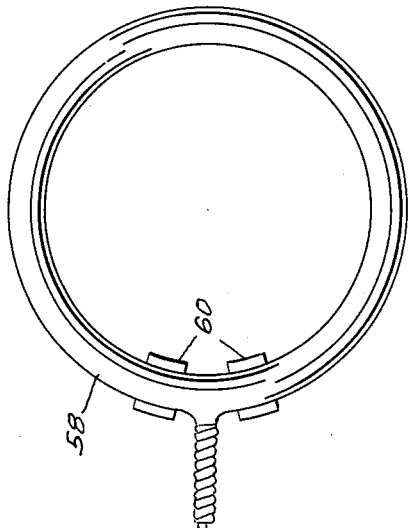
Figure 2:
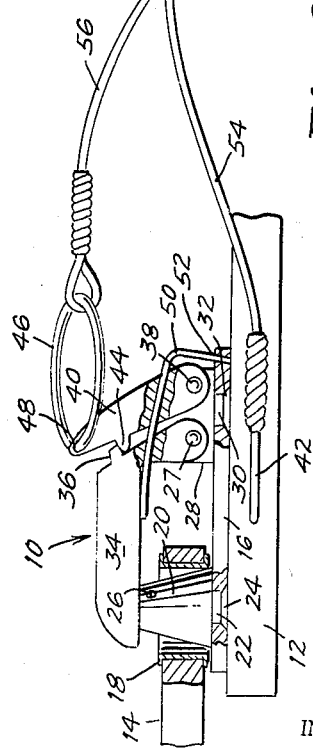

FIGURE 1 is a top view of the release mechanism of this invention with the packing pin in place; and FIGURE 2 is a perspective view, partially broken away, showing the release mechanism in its closed, operating position with the packing pin withdrawn.

The same referenced numerals denote the same parts throughout both views of the drawing.

In reference to the figures, the parachute release mechanism of this invention is shown generally at 10 and is preferably secured to the opening flap 12 of a parachute pack by means of a base or attaching plate 16 and rivets or brads 19. The second flap 14, which is used to hold the main opening or release flap 12 closed, is held securely in a closed position by passing the eyelet 18 contained therein over a holder or core 20 prior to the closing of a clamp and catch mechanism as will be more fully explained hereinafter. The core 20, which is generally tapered or conical in shape to facilitate release of the eyelet 18 when the release mechanism is operated, is secured to the face of the base plate 16 by the extended portion 22 which passes through an apparatus in the plate and is braded or flared out at the end 24. Located at the upper end or top of the core 20 is an aperture 26 for receiving a packing pin 42 used to facilitate the packing and handling of the parachute prior to its actual use.

A pin supporting or carrying plate 28, on which two pivot pins 27 and 38 are mounted, is also secured to the top or face of the base 16 by an extended portion 30 passing through an aperture in the plate. The end portion 32 of the extended portion 30 is braded or flared out at the bottom of the plate 16 for securing the plate 28 in place. Pivotly mounted around pin 27 is a generally L-shaped clamp 34 which has a lug or projection 36 located thereon. A locking or catch arm 40, which is pivotly mounted on the pin 38, is provided with a lug or projection 44 which fits under the lug 36 of the clamp 34 thereby preventing the clamp from pivoting about its pivot pin 27. Thus, it is seen that the greater the pressure exerted in an upward direction on the left hand end of the clamp 34 the tighter the lug 36 is seated on the projection 44 so that the clamp cannot be forced open by the upward pressure exerted thereon. A spring 50, which passes under and exerts an upward opening pressure or force on the catch 34 when it is in its closed position, is seated in apertures 52 located in the base plate 16.

Located at the upper or free end of the arm 40 is an aperture 48 through which an O-ring 46 passes. Both the packing pin 42 and the O-ring 46 are connected by ripcords 54 and 56, respectively, to a ripcord release or D-ring 58. As can be seen in the figures, cord 54 is made somewhat shorter than is cord 56 so that when the parachute is properly packed and the ring 58 is placed in its holder 60, as shown in FIGURE 2, pin 42 will be automatically withdrawn from the aperture 26 thereby leaving only the clamp 34 holding the parachute in its closed position. FIGURE 1 illustrates the use of the packing pin for holding the parachute closed during packing and handling and prior to the release ring 58 being placed in the holder 60.

The operation of the parachute release mechanism may be explained in substantially the following manner.

The release mechanism 10 is "loaded" (once the parachute is properly packed) by placing the eyelet 18, carried on flap 14, over the core 20 while the catch 34 is biased open and away from the core by the spring 50. The pin 42 is then inserted in the aperture 36 to hold the flap 14 in place over the core while the remainder of the parachute is checked and placed in operating condition. Once the parachute is completely packed and all adjustments are made, the clamp 34 is pressed downward against the pressure of the spring 50 until it rests against the top of core 20 at which time the lug 44 of the locking catch 40 is positioned under the lug 36 carried by the clamp. The parachute release mechanism is now in the "loaded" position as seen in FIGURE 1.

With both the pin 42 and catch 40 in position as shown in FIGURE 1, the release has a "double safety" feature which is extremely useful for handling the parachute since, should either pin 42 or catch 40 be accidentally removed, the parachute will not open.

When the packing and adjustment of the parachute are complete and it is desirable to place the parachute in a ready or operating condition, the release or D-ring 58 is placed in the holder 60 thereby pulling the packing pin 42 from the aperture 26 as shown in FIGURE 2. With the parachute in this condition, a further pull or jerk on the release ring 58 will transmitted through the flexible cable or ripcord 56 and will cause the catch 40 to pivot to the right about the pivot pin 38. This movement of the catch 40 causes lug 44 to slide from under lug 36 thereby releasing the clamp 34 for movement about its pivot 27. The pressure of either the spring 50 or that produced by the eyelet 18 tending to slide off the conical core 20 will normally be more than ample to move the clamp 34 away from the end of the core and thus release the eyelet. With the flap 14 no longer held by the release arrangement, the opening flap 12 will now be free to release the parachute canopy which is normally so packed as to exert a sufficient outward pressure on the flap 12 so as to cause the flap to open on its own accord. However, by the operator's initial jerk or pull upon the release or D-ring being transmitted through the release mechanism 10 to the flap 12, the flap will be opened faster than flaps of heretofore known parachutes which relied only upon the outward pressure of the parachute canopy to open them. It is also obvious that this type of release arrangement does not depend upon the spring 50 being in perfect operating condition nor upon the parachute itself exerting enough outward pressure to open the release mechanism since the operator can not only remove the catch arm 40 of the release arrangement by pulling the ripcord but also the flaps 12 and 14 since the ripcord does not come free of the arrangement as is the usual case.

From the foregoing, it is readily seen that the parachute release mechanism constructed in accordance with this invention will be economical and, more importantly, it will be foolproof in operation. Not only does the release mechanism make it extremely simple to pack and handle the parachute due to the use of a packing pin arrangement but, due to the design and construction of the release, no type of blow or force can damage or deform the release so that it will be rendered inoperative when the ripcord is pulled. At worst, an extremely sharp blow might bend or deform the catch but this would only result in the parachute opening when the release was subjected to the blow and this condition could easily be detected and corrected prior to the parachute being put into actual use. The fact that the ripcord always remains directly connected to the opening flap permits the release arrangement to serve a dual purpose in not only providing an emergency means for opening the parachute should either the packing or opening spring fail to exert sufficient operating force but also in assuring that the parachute will operate or open more rapidly than heretofore known like devices.

While the release mechanism has been described in relationship to its use in a parachute pack, it is to be recognized that the novel release of this invention is equally adapted to other uses. It will also be readily apparent that certain modifications or changes can be made in both the construction and operation of the release without departing from the invention. For example, a "double safety" release could be produced if the packing pin were designed so that it remained in engagement within the release arrangement until the operating mechanism of the device was pulled or actuated at which time it would be withdrawn slightly ahead of or prior to the release of the main catch. It will also be apparent that the release device could be hooked up with a time clock or an explosive type release mechanism whereby equipment or passengers could be safely and automatically ejected from a plane.

The invention may be embodied in other specific forms without departing from the spirit or essential characteristics thereof. The present embodiments are, therefore, to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by the United States Letters Patent is:

1. A parachute release mechanism comprising a plate member for securing to a flap of a parachute; a core member mounted on said plate member; an aperture located in said core member; a pin supporting member secured to said plate; a clamp member pivotally mounted on a first pin carried by said support member; a spring for biasing said clamp member in an open position; a catch member pivotally mounted on a second pin carried by said support member; means located on said catch member for engaging said clamp member thereby holding said clamp member in a closed position against said core member; cord means secured to said catch member for releasing said clamp member; a pin member for inserting into said aperture; said pin member serving to prevent said release mechanism from accidentally opening; and cord means secured to said pin member for removing said pin member; said cord secured to said pin member being shorter than said cord secured to said catch member whereby when said cords are pulled simultaneously said pin member will be removed from said aperture prior to said catch member releasing said clamp member thereby operating said parachute release mechanism.

2. A parachute release mechanism according to claim 1 wherein said cords are secured to a release means; and holder means for said release means; said holder means being located at a greater distance from said release mechanism than the length of said cord secured to said pin member so that said pin member will be removed from said apertures when said release means is placed in said holder means.

3. A parachute release mechanism according to claim 2 wherein said release means is permanently secured to said clamp means by said cord means.

4. A parachute release mechanism according to claim 3 wherein said plate member is secured to the opening flap of said parachute.

5. A parachute release mechanism comprising a flat plate member; means for securing said plate member to the opening flap of a parachute; a core member secured to the face of said plate member; said core member being tapered away from said plate and having an aperture located near its small end; a removable pin located in said aperture; said pin being of sufficient length to project from either side of said core member when located in said aperture; a clamp member pivotally mounted on said plate member so as to rest on the end of said core member in a first position and away from said end in a second position; a catch member pivotably mounted on said plate member; said catch member engaging said clamp member for holding said clamp member in said first position; a first cord member for releasing said catch member so that said clamp member can move to said second position; means securing said first cord member to said catch member; a second cord member; means securing said second cord member to said pin; said first cord member being longer than said second cord member; and means connecting said first and second cord members together whereby when said last named means is pulled said pin will be withdrawn from said aperture prior to said catch member releasing said clamp member.

6. A parachute release device adapted to be used in packing and releasing a parachute canopy consisting of an opening flap for holding a canopy within a parachute pack and a release mechanism for holding said flap closed until released; said release mechanism comprising a mounting means; means for securing said mounting means to said opening flap; a clamping arm movably connected to said mounting means; a core means mounted on said mounting means; said core means being tapered away from said mounting means; an aperture located in said core means near its outer end; a pin for inserting through said aperture; means for forcibly throwing said clamping arm away from its first position of engagement with the end of said core means; releasable means for holding said clamping arm in said first position; a first flexible cable means connected to said pin; a second cable means connected to said releasable means; operating means connected to said first and second cable means for pulling them taut; said first cable means being drawn taut before said second cable means; said second cable means being so connected to said opening flap that in its taut condition said cable means will open said flap thereby releasing said canopy.

7. A parachute release mechanism comprising a plate member to be secured to a flap of a parachute; a post upstanding from said plate member; said post having a lower end attached to one surface of said plate member and having an upper end spaced from said plate member and facing in the same direction as said one surface; support means rigidly mounted on said plate member; a clamp pivotally mounted on said support means for pivotal movement about an axis substantially parallel to said plate member from a first position in engagement with said upper end of said post to a second position out of engagement with said upper end of said post; a catch member pivotally mounted on said support means for pivotal movement about an axis substantially parallel to said plate member from a first position locking said clamp in its first position to a second position unlocking said clamp to permit it to move to its second position; and spring means biasing said clamp toward said second position and into said catch member.

8. A parachute release mechanism comprising a plate member secured to a flap of a parachute; a tapered post upstanding from said plate member; said post having a lower end attached to one surface of said plate member and having an upper end spaced from said plate member and facing in the same direction as said one surface; support means rigidly affixed to said plate member; a clamp pivoted on said support means and rotatable about an axis substantially parallel to said plate member from a clamping position in engagement with said upper end of said post to a release position out of engagement with said upper end of said post; a catch member pivoted on said support means and rotatable about an axis substantially parallel to said plate member from a locking position in engagement with said clamp to lock said clamp in said clamping position to an unlocking position to free said clamp and allow its movement to the release position; and a ripcord attached to said catch member to permit pulling said catch member from said locking to said unlocking position.

9. A parachute release mechanism as set out in claim 8 wherein said support means comprises a plate rigidly affixed to said plate member; said clamp comprising an L-shaped lever; and said catch member comprises a lever having a lock surface which matingly engages said clamp when said clamp is in said clamping position.

10. A parachute release mechanism comprising a plate member secured to a flap of a parachute; a tapered post upstanding from said plate member; support means rigidly affixed to said plate member; a clamp pivoted on said support means and rotatable about an axis substantially parallel to said plate member from a clamping position in engagement with said post to a release position out of engagement with said post; a catch member pivoted on said support means and rotatable about an axis substantially parallel to said plate member from a locking position in engagement with said clamp to lock said clamp in said clamping position to an unlocking position to free said clamp and allow its movement to the release position; a ripcord attached to said catch member to permit pulling said catch member from said locking to said unlocking position; said post having a transverse aperture therethrough; and a pin extending through said aperture and connected to said ripcord in such manner that on pulling said ripcord, said pin is pulled from said aperture before said catch member moves to said unlocking position.

11. A parachute release mechanism as set out in claim 10 wherein said support means comprises a plate rigidly affixed to said plate member; said clamp comprises an L-shaped lever; and said catch member comprises a lever having a lock surface which matingly engages said clamp when said clamp is in said clamping position.

12. A parachute release mechanism as set out in claim 11 wherein said mating engagement occurs between a lug on said clamp and a lug on said catch member.

13. A release mechanism comprising a plate; a post upstanding from said plate substantially normal thereto; said post having a lower end attached to one surface of said plate member and having an upper end spaced from said plate member and facing in the same direction as said one surface; a lug rigidly mounted on said plate, an L-shaped clamp arm pivoted to said lug on an axis substantially parallel to said plate, said clamp having one arm rotatable into and out of engagement with said upper end of said post; said one arm moving toward said one surface of said plate in moving into engagement with said upper end of said post; a latch arm pivoted to said lug on an axis substantially parallel to said plate; said latch arm and clamp arm carrying mating lug means engageable to lock said clamp arm in engagement with said post; means biasing said clamp arm out of engagement with said post but into engagement with said latch arm whereby said mating lug means holds said clamp arm in engagement with said post; and means attached to said latch arm to cause said mating lug means to part to allow said clamp arm to move out of engagement with said post.

14. A release mechanism comprising a plate; a post upstanding from said plate substantially normal thereto; a lug rigidly mounted on said plate, an L-shaped clamp arm pivoted to said lug on an axis substantially parallel to said plate, said clamp being rotatable into and out of engagement with said post; a latch arm pivoted to said lug on an axis substantially parallel to said plate; said latch arm and clamp arm carrying mating lug means engageable to lock said clamp arm in engagement with said post; means biasing said clamp arm out of engagement with said post but into engagement with said latch arm whereby said mating lug means holds said clamp arm in engagement with said post; and means attached to said latch arm to cause said mating lug means to part to allow said clamp arm to move out of engagement with said post; said post having an aperture therethrough substantially parallel to said plate; and including a pin in said aperture attached to said means attached to said latch means so that actuation of said means attached to said latch means causes withdrawal of said pin and thereafter causes said mating lug means to part.

15. A release mechanism as set out in claim 14 wherein said means attached to said latch arm comprises a cord; said pin being attached to said cord by a second cord.

References Cited in the file of this patent

UNITED STATES PATENTS

| | | |
|---|---|---|
| 2,718,369 | MacMillan | Sept. 20, 1955 |
| 2,931,231 | Felix | Apr. 5, 1960 |

FOREIGN PATENTS

| | | |
|---|---|---|
| 39,179 | Switzerland | Jan. 17, 1907 |
| 29,880 | France | Aug. 18, 1925 |
| 268,498 | Great Britain | Apr. 7, 1927 |
| 617,327 | Germany | Aug. 16, 1935 |
| 116,172 | Australia | Nov. 18, 1942 |
| 931,168 | France | Sept. 22, 1947 |
| 463,173 | Italy | Apr. 18, 1951 |